(12) United States Patent
Horton et al.

(10) Patent No.: US 11,613,227 B2
(45) Date of Patent: Mar. 28, 2023

(54) TETHER ACTUATION UNIT FOR AIRBAG MODULE

(71) Applicant: ZF Passive Safety Systems US Inc., Washington, MI (US)

(72) Inventors: Uriah Horton, North Branch, MI (US); Douglas Gould, Lake Orion, MI (US)

(73) Assignee: ZF PASSIVE SAFETY SYSTEMS US INC., Washington, MI (US)

(*) Notice: Subject to any disclaimer, the term of this patent is extended or adjusted under 35 U.S.C. 154(b) by 0 days.

(21) Appl. No.: 17/376,393

(22) Filed: Jul. 15, 2021

(65) Prior Publication Data

US 2023/0013077 A1    Jan. 19, 2023

(51) Int. Cl.
*B60R 21/2338* (2011.01)
*B60R 21/239* (2006.01)

(52) U.S. Cl.
CPC ........ *B60R 21/2338* (2013.01); *B60R 21/239* (2013.01); *B60R 2021/2395* (2013.01); *B60R 2021/23384* (2013.01)

(58) Field of Classification Search
CPC ............. B60R 21/2338; B60R 21/239; B60R 2021/23384; B60R 2021/2395
See application file for complete search history.

(56) References Cited

U.S. PATENT DOCUMENTS

| 8,602,453 | B1* | 12/2013 | Stevens | B60R 21/217 |
| | | | | 280/743.2 |
| 8,851,519 | B1* | 10/2014 | Stevens | B60R 21/2338 |
| | | | | 280/739 |
| 9,776,591 | B1* | 10/2017 | Jeong | B60R 21/2338 |
| 2006/0061076 | A1* | 3/2006 | Webber | B60R 21/276 |
| | | | | 280/736 |
| 2021/0170970 | A1* | 6/2021 | Peremarty | B60R 21/2338 |

FOREIGN PATENT DOCUMENTS

| CN | 102186702 | A | * | 9/2011 | ......... B60R 21/2338 |
| DE | 102019208352 | A1 | * | 12/2020 | |
| EP | 1769978 | A1 | * | 4/2007 | ........... B60R 21/239 |
| EP | 3950437 | A1 | * | 2/2022 | ......... B60R 21/2338 |
| GB | 2432344 | A | * | 5/2007 | ........... B60R 21/233 |
| WO | WO-2019141676 | A1 | * | 7/2019 | ......... B60R 21/2338 |

* cited by examiner

*Primary Examiner* — Drew J Brown
(74) *Attorney, Agent, or Firm* — Tarolli, Sundheim, Covell & Tummino LLP (57) ABSTRACT

A tether actuation unit includes an actuator configured to form a connection with a tether that is releasable in response to actuation of the actuator, and a housing configured to receive the actuator. The housing includes a tether channel configured to allow the tether to extend therethrough. The tether channel includes sidewalls configured to receive and engage the tether along a portion of its length when the tether extends at an angle from the housing. The sidewalls of the tether channel are configured to limit movement of the tether in response to airbag deployment in order to limit tension applied to the actuator by the tether to a predetermined range of non-orthogonal directions with respect to a central axis of the actuator.

16 Claims, 7 Drawing Sheets

TETHER ACTUATION UNIT FOR AIRBAG MODULE

TECHNICAL FIELD

The invention relates to vehicle safety systems including airbag modules. More particularly, the invention relates to a tether actuation unit that can form a component of an airbag module. In one example implementation, the tether actuation unit is actuatable to release a tether that helps control the deployment of the airbag.

BACKGROUND

It is known to provide an inflatable vehicle occupant protection device, such as an airbag, for helping to protect an occupant of a vehicle. Airbags are deployable in response to the occurrence of an event for which occupant protection is desired, such as an impact to the vehicle, a vehicle collision, a vehicle rollover, or a combination thereof.

Frontal collisions refer to collision events in which a vehicle experiences an impact at the front of the vehicle. These frontal collisions cause front seat vehicle occupants to move forward in the vehicle toward structures, such as the steering wheel (driver side occupant) and/or the instrument panel (passenger side occupant).

Oblique collisions refer to collisions that occur in an angled or offset manner. An angled collision refers to a collision in which the vehicle strikes an angled surface or another vehicle travelling in an angled, non-parallel direction. An offset collision refers to a collision in which the vehicle strikes a vehicle or other object that does not fully overlap with the vehicle front end. In either instance, oblique collisions result in the occupant moving in an oblique direction (e.g., diagonally) in the vehicle, with both forward and lateral components.

To help protect occupants of vehicles involved in frontal collisions, the vehicle can be equipped with frontal airbags. On the passenger side of the vehicle, frontal airbags are typically deployed from a housing located within the instrument panel of the vehicle. On the driver side of the vehicle, frontal airbags are typically deployed from a housing located within the steering wheel.

It may be desirable to control the deployment of a frontal airbag in response to vehicle and/or occupant conditions at the time of deployment. For example, frontal airbag deployment can be controlled through the selective actuation of an airbag vent. In this instance, it may be desirable to selectively actuate an airbag vent in order to vent inflation fluid from the frontal airbag in response to a sensed occupant condition at the time of deployment. An example of this can be selectively actuating an airbag vent in response to a sensed seat position at the time of deployment. For instance, the airbag vent can be actuated in response to sensing a forward position of the vehicle seat, which can indicate the presence of a small occupant positioned close to the steering wheel and/or instrument panel. If a rearward position of the seat is sensed, which can indicate the presence of a large occupant, the vent can remain unactuated.

As another example, it may be desirable to control the shape or extent of a frontal airbag in response to the type of vehicle crash that resulted in the deployment. For example, a frontal airbag can include inflatable portions or chambers configured to help protect an occupant moving in response to an oblique collision. The chambers can be deployed in response to crash sensors indicating that an oblique collision has occurred. The chambers can remain undeployed in response to crash sensors indicating that a frontal collision has occurred.

The above represent just two examples of scenarios where it may be desirable to control airbag deployment. There are many other scenarios in which it may be desirable to control airbag deployment. Additionally, it may be desirable to control the deployment of airbags other than frontal airbags. It may be desirable, for example, to control the deployment of side airbags, curtain airbags, knee airbags, seatbelt airbags, and others.

SUMMARY

The invention relates to a tether actuation unit for controlling the operation of an airbag tether. The tether actuation unit secures the tether to the vehicle, e.g., to an airbag module. The tether is also connected to a portion of the airbag that controls the deployment thereof. In an unactuated condition, the tether actuation unit maintains the connection of the tether to the vehicle. In an actuated condition, the tether actuation unit releases the tether from its connection to the vehicle.

In one example implementation, the tether actuation unit can be connected to a frontal airbag module. In this example implementation, the tether actuation unit can be connected to a housing or a portion thereof, such as a reaction canister. A tether, connected to the tether actuation unit, can also be connected to a portion of the airbag, such as a vent or an inflatable chamber. In response to sensed vehicle conditions, an airbag control unit can selectively actuate the tether actuation unit to control deployment of the airbag through operation of the vent/chamber.

According to one aspect, a tether actuation unit includes an actuator configured to form a connection with a tether that is releasable in response to actuation of the actuator, and a housing configured to receive the actuator. The housing includes a tether channel configured to allow the tether to extend therethrough. The tether channel includes sidewalls configured to receive and engage the tether along a portion of its length when the tether extends at an angle from the housing. The sidewalls of the tether channel are configured to limit movement of the tether in response to airbag deployment in order to limit tension applied to the actuator by the tether to a predetermined range of non-orthogonal directions with respect to a central axis of the actuator.

According to another aspect, the sidewalls of the tether channel can also be configured to permit the tether to apply tension on the actuator along a range of angles orthogonal to the central axis of the actuator. The range of angles orthogonal to the central axis of the actuator can be greater than the range of non-orthogonal directions with respect to the central axis of the actuator.

According to another aspect, the sidewalls of the tether channel can include outwardly curved sidewalls that help define the range of angles orthogonal to the central axis of the actuator that the tether can apply tension to the actuator.

According to another aspect, the outwardly curved sidewalls can be configured to prevent stress risers along portions of the tether that engage the housing.

According to another aspect, the tether channel can have an outwardly flared configuration.

According to another aspect, the sidewalls of the tether channel can include closely spaced, parallel sidewalls that help define the range of angles non-orthogonal to the central axis of the actuator that the tether can apply tension to the actuator.

According to another aspect, the closely spaced parallel sidewalls can be configured to prevent tension applied to the actuator by the tether from damaging the actuator.

According to another aspect, the housing can be configured to be connected to an airbag housing, and the tether channel can be configured to extend through an opening in the airbag housing and into a housing chamber of the airbag housing.

According to another aspect, the housing can be configured to be connected to an outer surface of the airbag housing.

According to another aspect, the housing can include clips configured to be received in openings in the airbag housing to connect the tether actuation unit to the airbag housing.

According to another aspect, the housing can include feet configured to engage an outer surface of the airbag housing.

According to another aspect, the actuator can include a tether collar portion configured to secure a looped portion of the tether. The housing can be configured so that the collar portion is aligned with the tether channel when assembled with the actuator.

According to another aspect, an apparatus for helping to protect an occupant of a vehicle includes an airbag, the tether actuation unit, and a tether connected to the tether actuation unit and to a portion of the airbag. The tether actuation unit has an unactuated condition maintaining a connection with the tether, and an actuated condition releasing its connection with the tether to help control deployment of the airbag.

According to another aspect, the tether can be connected to a chamber of the airbag. The tether can restrict deployment of the chamber in the unactuated condition of the tether actuation unit. The tether can release the chamber to deploy in the actuated condition of the tether actuation unit.

According to another aspect, the tether can be connected to an airbag vent. The tether can maintain the airbag vent in one of an open and closed condition in the unactuated condition of the tether actuation unit. The tether can release the airbag vent to the other of the open and closed condition in the actuated condition of the tether actuation unit.

According to another aspect, an airbag module includes an apparatus for helping to protect an occupant of a vehicle. The apparatus includes an airbag, the tether actuation unit, and a tether connected to the tether actuation unit and to a portion of the airbag. The tether actuation unit has an unactuated condition maintaining a connection with the tether, and an actuated condition releasing its connection with the tether to help control deployment of the airbag. The airbag module also includes an inflator for inflating the airbag, and an airbag housing for supporting the airbag, the inflator, the tether actuation unit, and the tether for installation in a vehicle as a unit.

According to another aspect, the airbag housing can include a reaction canister configured for installation in an instrument panel on a passenger side of a vehicle.

According to another aspect, a vehicle safety system includes the airbag module described above, at least one sensor, and an airbag control unit that is operatively connected to the inflator, the tether actuation unit, and to the at least one sensor. The airbag control unit is configured to identify the occurrence of a vehicle crash in response to signals received from the at least one sensor. The airbag control unit is further configured to actuate the inflator in response to detecting the vehicle crash, and to selectively actuate the tether actuation unit in response to conditions detected via the at least one sensor.

DESCRIPTION

The invention relates to a tether actuation unit for controlling the operation of an airbag tether. The tether actuation unit can be implemented in any vehicle safety system in which the deployment of an airbag is controlled through the selective actuation of a tether. By selective actuation, it is meant that airbag deployment is controlled by selectively releasing the tether from a connection to the vehicle, for example, to a housing. The tether actuation unit therefore serves to anchor the tether to the vehicle and is actuatable to release the tether from this anchored condition.

Through this operation, the tether actuation unit can be used to control the release of inflation fluid through an airbag vent, or to control the deployment of one or more airbag chambers. These implementations are not meant to be restrictive. The tether actuation unit can be used to selectively control the release of a tether to help control any aspect of airbag deployment or airbag module function and/or performance.

Figure 1:
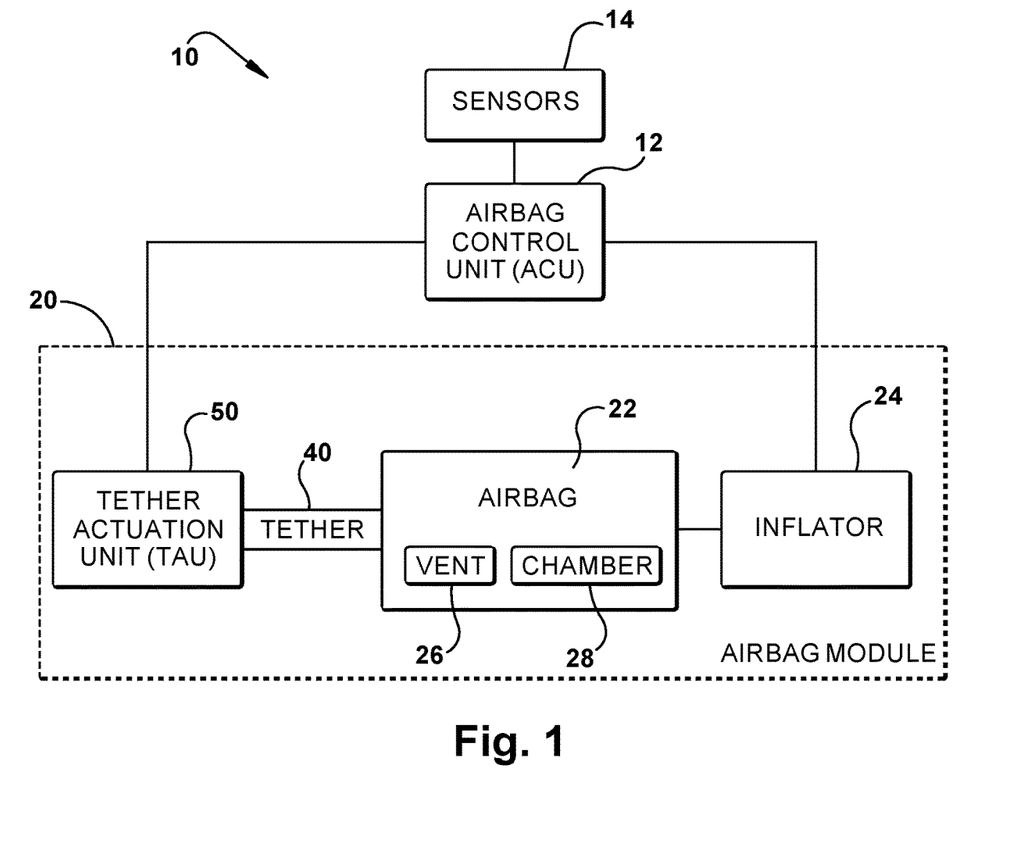
FIG. 1 is a functional block diagram illustrating a vehicle safety system including an airbag module with a tether actuation unit, according to one example configuration.

An example implementation of the tether actuation unit is illustrated in FIG. 1. As shown in FIG. 1, a vehicle safety system 10 includes an airbag module 20. The airbag module 20 includes an airbag 22 and an inflator 24 for providing inflation fluid for inflating the airbag. The airbag module also includes a tether 40 for helping to control deployment of the airbag 22. In this regard, the tether 40 can help control deployment of the airbag 22 by controlling the operation of an airbag vent 26 or the deployment of an inflatable chamber 28 of the airbag.

A tether actuation unit ("TAU") 50 controls the actuation of the tether 40. More specifically, the TAU 50 connects the tether 40 to the airbag module 20 and controls actuation of the tether by releasing this connection. In the case of the aforementioned vent 26, the vent can be a normally open vent held open by the tether 40 and configured to close in response to the TAU 50 releasing the tether. Alternatively, the vent 26 can be a normally closed vent held closed by the tether 40 and configured to open in response to the TAU 50 releasing the upon release of the tether. In the case of the aforementioned chamber 28, the tether 40 can be configured to restrict deployment of the chamber while connected to the TAU 50. In this instance, actuation of the TAU 50 releases the tether 40, which allows the chamber 28 to deploy.

The vehicle safety system 10 also includes an airbag control unit ("ACU") 12 that is operative to control both the inflator 24 and the TAU 50. The vehicle safety system 10 also includes one or more sensors 14 for sensing vehicle and/or occupant conditions. The sensors 14 can include vehicle motion and relative distance sensors, such as accelerometers, RADAR sensors, LIDAR sensors, camera sensing systems, and ultrasonic sensors. The sensors 14 can also include vehicle condition sensors, such as seatbelt sensors, seat sensors, occupant presence sensors, and camera sensing systems.

The ACU 12 is operative to determine the occurrence of an event for which deployment of the airbag 22 is desired based on signals and information obtained via the sensors 14. The ACU 12 is configured to actuate the inflator 24 in response to determining the occurrence of such events. The ACU 12 is also configured to determine vehicle and/or occupant conditions at the time of the sensed event and to determine whether to actuate the TAU 50 to control deployment of the airbag 22.

For instance, it might be desirable to vent inflation fluid from the airbag 22 if an occupant is positioned close to the airbag module 20 at the time of deployment. In this instance, the ACU 12 can determine the presence of an occupant in a forward position, for example, via a seat position sensor or a camera sensor, and control the operation of the TAU 50 so that the vent 26 vents inflation fluid from the airbag 22. In the case of a normally open vent 26, the ACU 12 can maintain the TAU 50 in the unactuated condition so that the tether 40 is not released and the vent remains open. In the case of a normally closed vent 26, the ACU can actuate the TAU 50 to release the tether 40 so that the vent opens.

As another example, it might be desirable to block inflation fluid venting from the airbag 22 if a large occupant is positioned spaced from the airbag module 20 at the time of deployment. In this instance, the ACU 12 can determine the presence of the large, rearward positioned occupant, for example, via a seat position sensor or a camera sensor, and control the operation of the TAU 50 to block inflation fluid venting through the vent 26 vents. In the case of a normally closed vent 26, the ACU 12 can maintain the TAU 50 in the unactuated condition so that the tether 40 is not released and the vent remains closed. In the case of a normally open vent 26, the ACU can actuate the TAU 50 to release the tether 40 so that the vent closes.

As another example, it might be desirable to deploy the airbag chamber 28 vent inflation fluid from the airbag 22 if an oblique collision is detected at the time of deployment. When the ACU 12 detects an oblique collision, it can actuate the TAU 50 to release the tether 40 so that the chamber 28 is released to inflate and deploy.

Figure 2:
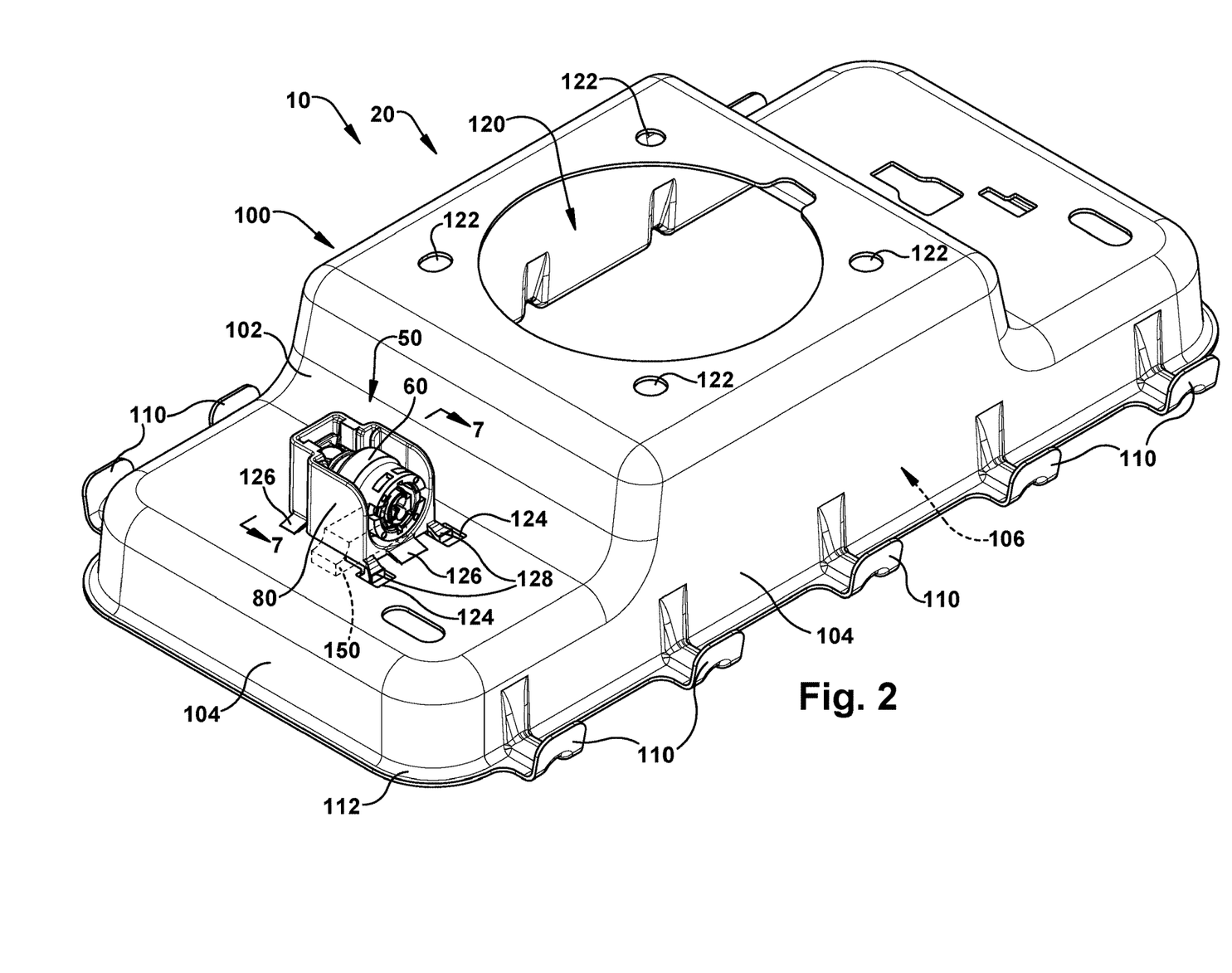
FIG. 2 is a perspective view illustrating a portion of the airbag module fitted with the tether actuation unit, according to one example configuration.
Figure 3:
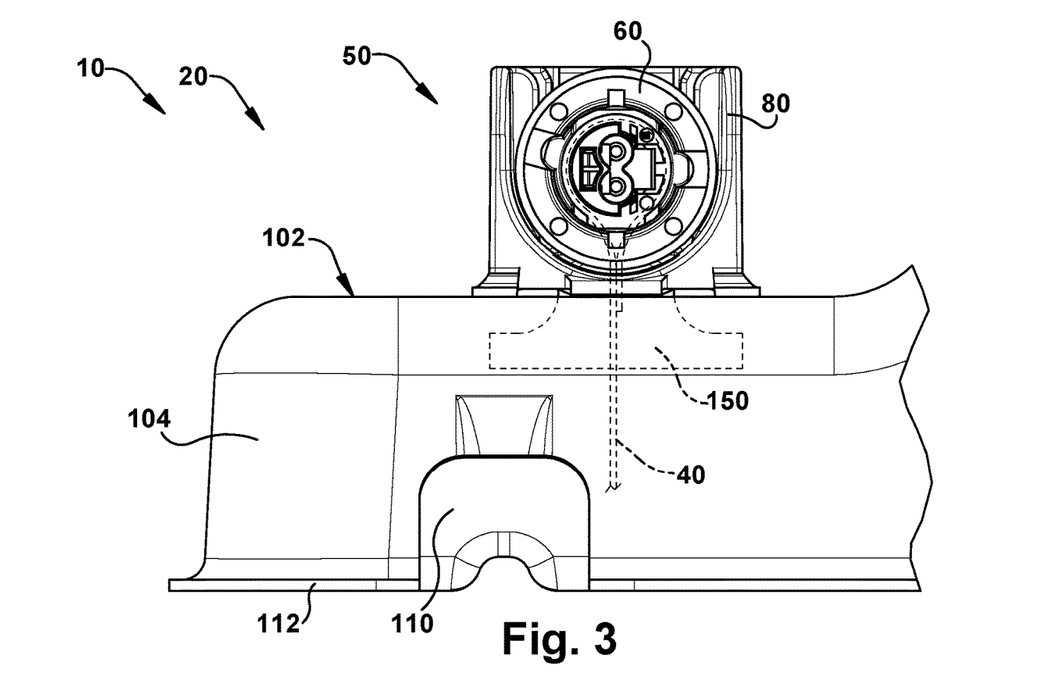
FIGS. 3 and 4 are opposite end views of a portion of the airbag module of FIG. 2.
Figure 4:
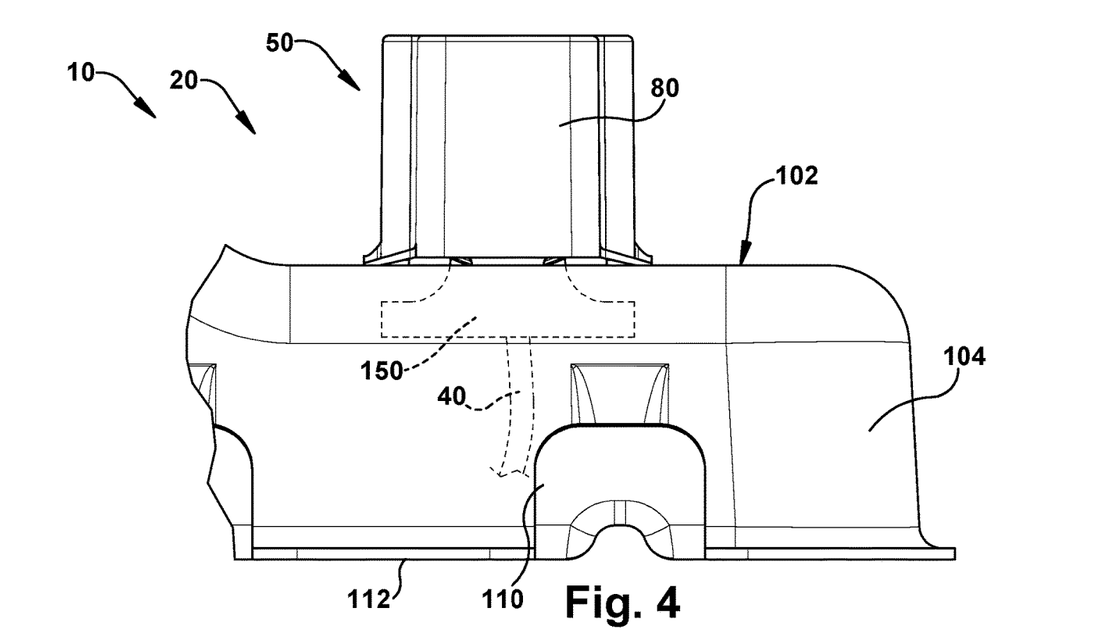

An example implementation of the TAU 50 in an airbag module 20 is illustrated in FIGS. 2-4. The airbag module 20 includes an airbag housing in the form of a reaction canister 100. In the example implementation of FIGS. 2-4, the airbag module 20 is a passenger frontal airbag module configured for installation in an instrument panel on a passenger side of the vehicle. This passenger frontal airbag module implementation is for purposes of illustration and is not meant to limit the implementation of the TAU 50. The TAU 50 can be implemented in any airbag module for which it is desirable to help control deployment via tether actuation. The reaction canister 100 is illustrated rear side up, with the TAU 50 mounted on a rear wall 102 of the canister. The TAU 50 could, of course, be mounted on the reaction canister 100 at a different location.

The reaction canister 100 includes an inflator opening 120 configured to receive the inflator 24 (not shown in FIGS. 2-4) and a plurality of fastener receiving apertures 122 for receiving inflator studs used to secure the inflator to the reaction canister 100 and assemble the airbag module 20. The rear wall 102, along with side walls 104, define a housing chamber 106 configured to receive the airbag 22 (not shown in FIGS. 2-4) in a folded and stored condition. A plurality of retainer clips 110 extend from an upper rim 112 of the reaction canister 100. The retainer clips 110 are configured to secure a cover (not shown) to the reaction canister 100 to enclose the airbag 22 in the housing chamber 60.

Figure 5:
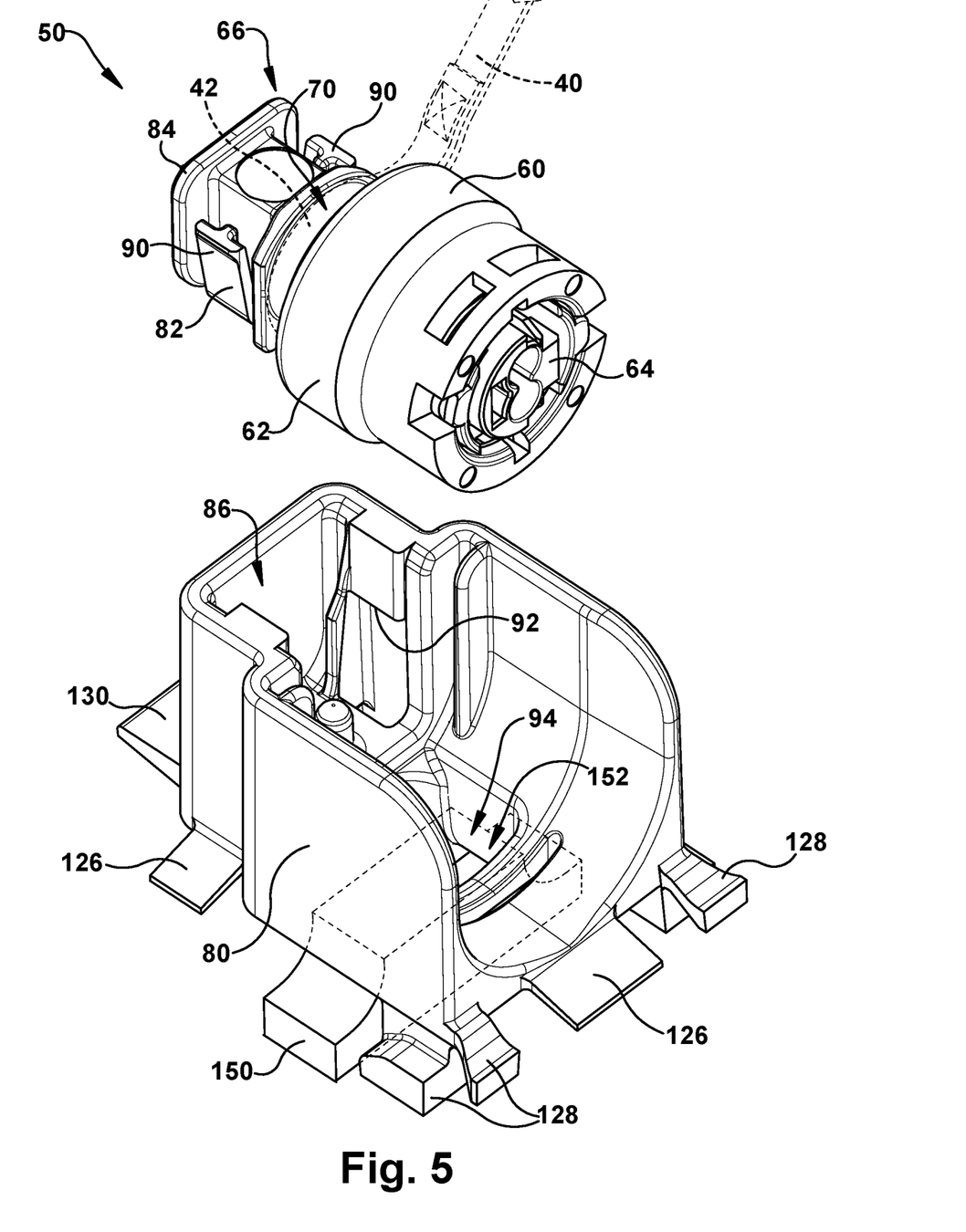
FIG. 5 is an exploded perspective view of the tether actuation unit.
Figure 6:
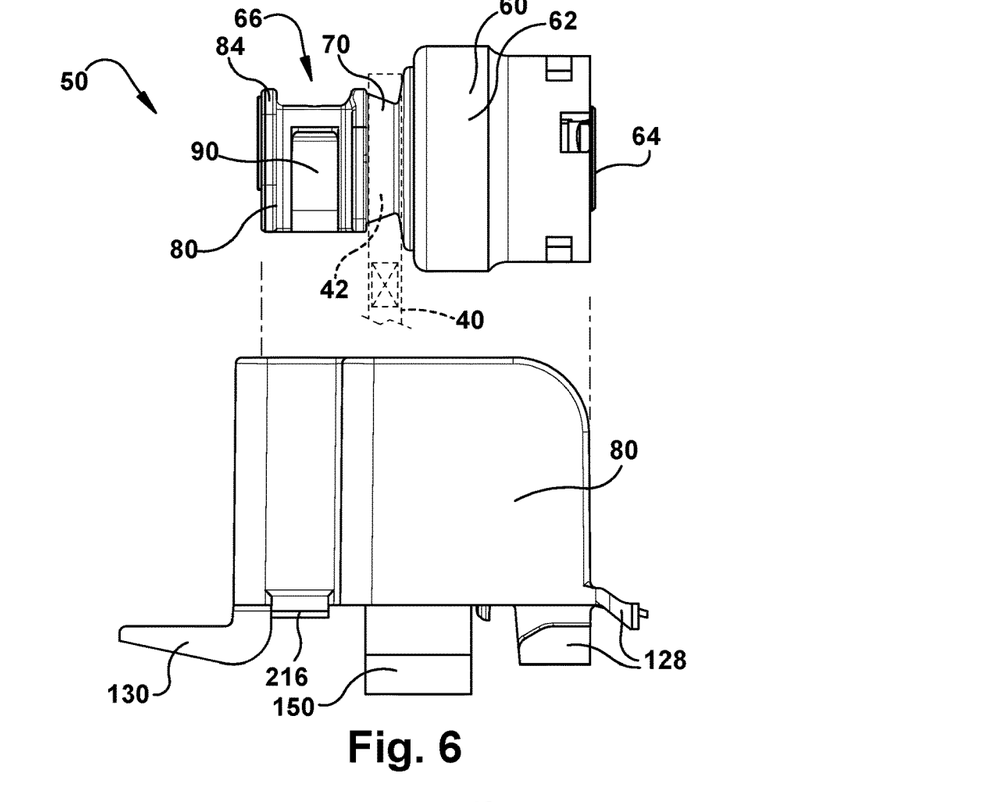
FIG. 6 is an exploded side view of the tether actuation unit.

Referring to FIGS. 5 and 6, the TAU 50 includes an actuator 60 and a TAU housing 80. The actuator 60 can be any actuator structure configured to maintain a connection with the tether 40, while being actuatable to release the connection with tether. In the example configuration illustrated in the Figures, the actuator 60 is a pyrotechnic actuator that utilizes a pyrotechnic charge to rupture the actuator and release the tether 40.

The actuator 60 includes a body portion 62 that contains the pyrotechnic charge material. An electrical connector 64 is connectable with wiring to operatively connect the actuator 60 to the ACU 12. An igniter (not shown), such as a squib, is electrically connected to the connector 64 and actuatable to ignite the pyrotechnic charge.

The actuator 60 also includes a tether collar 70 configured to receive a looped portion 42 of the tether 40 to secure the tether to the TAU 50. The tether collar 70 can be contoured to have a curved, generally U-shaped surface viewed in cross section, which helps eliminate engagement of the tether 40 with distinct or sharp edges that can result in stress risers in the tether material.

The TAU housing 80 is configured to receive and support the actuator 60 through a connection, such as an interference or snap-fit connection. To facilitate this connection, the TAU housing 80 can include a clip 82 that is fitted onto a head portion 66 of the actuator 60. The clip 82 can include a head portion 84 configured to be received in a corresponding slot 86 in the housing 80. The clip 82 can also include a pair of arms 90 configured to deflect when installed in the housing 80 and snap into a recess defined by a lip 92. This snap-fit between the arms 90 and the lip 92 retains the arms, the clip 82, and, thus, the actuator 60, in the housing 80.

The TAU housing 80 includes a tether opening 94 through which the tether 40 extends when assembled with the TAU 50. To assemble the TAU 50 with the tether 40, the looped end 42 of the tether is placed around the actuator 60 and positioned in the collar 70. The remainder of the tether 40 is passed through the tether opening 94 in the TAU housing 80. With the clip 80 fitted onto the head 66 of the actuator 60, the assemblage of the actuator, clip, and tether 40 is installed in the TAU housing 80. The snap-fit of the arms 90 with the lip 92 retains the actuator 60 in the housing 80, which secures the tether 40 to the TAU 50.

The TAU housing 80 includes feet 126 that rest against the rear wall 102 of the reaction canister 100, and clips 128 that extend through and clip into openings 124 in the rear wall of the reaction canister. A retention tab 130 extends through the rear wall 102 and helps initially position the TAU 50 on the reaction canister 100 and to retain the TAU on the reaction canister once installed. The feet 126 and clips 128 complete the connection of the TAU housing 80, and thus the TAU 50, to the reaction canister 100. The connection between the TAU 50 and the reaction canister 100 anchors the tether 40 to the reaction canister 100, to the airbag module 20, and to the vehicle.

Figure 7:
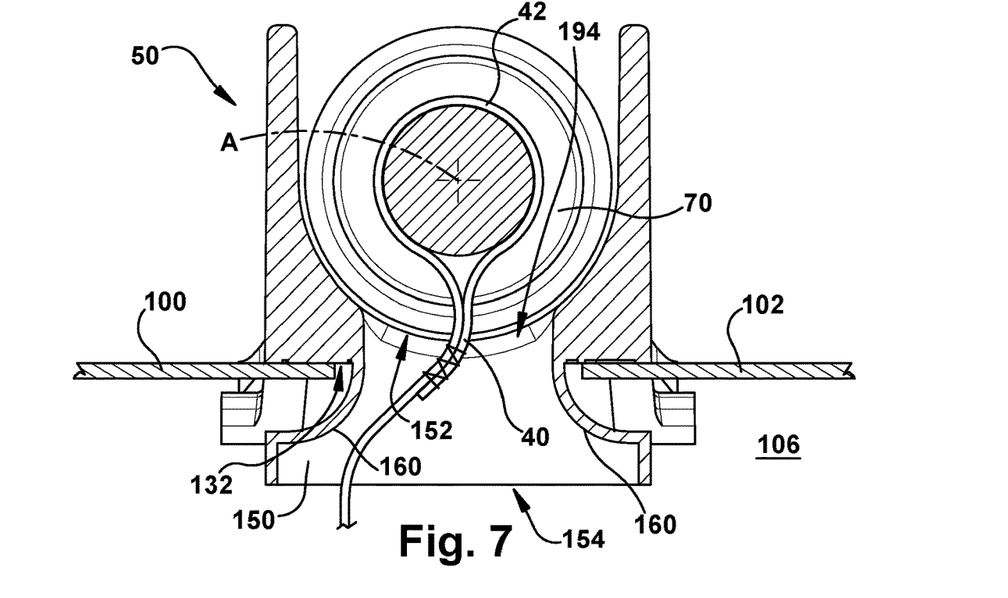
FIG. 7 is a sectional view of the tether actuation unit taken generally along line 7-7 in FIG. 2.

Referring to FIG. 7, The reaction canister 100 includes a tether opening 132 that extends through the rear wall 102 and aligns with the actuator collar 70 when the TAU 50 is installed. This allows the tether 40 to extend through the rear wall 102 and into the housing chamber 106, where it can be connected to the airbag 22, e.g., to a vent 26 and/or a chamber 28 (see, FIG. 1).

To help prevent damage to the tether 40, the TAU housing 80 includes a tether channel 150 through which the tether extends. The tether channel 150 has a mouth 152 that is formed by, and extends contiguously with, the tether opening 94. The tether channel 150 has an outwardly flared configuration with an open end 154 through which the tether 40 extends. Curved sidewalls 160 extend between the mouth and the open end 154 of the tether channel 150.

Figure 8:
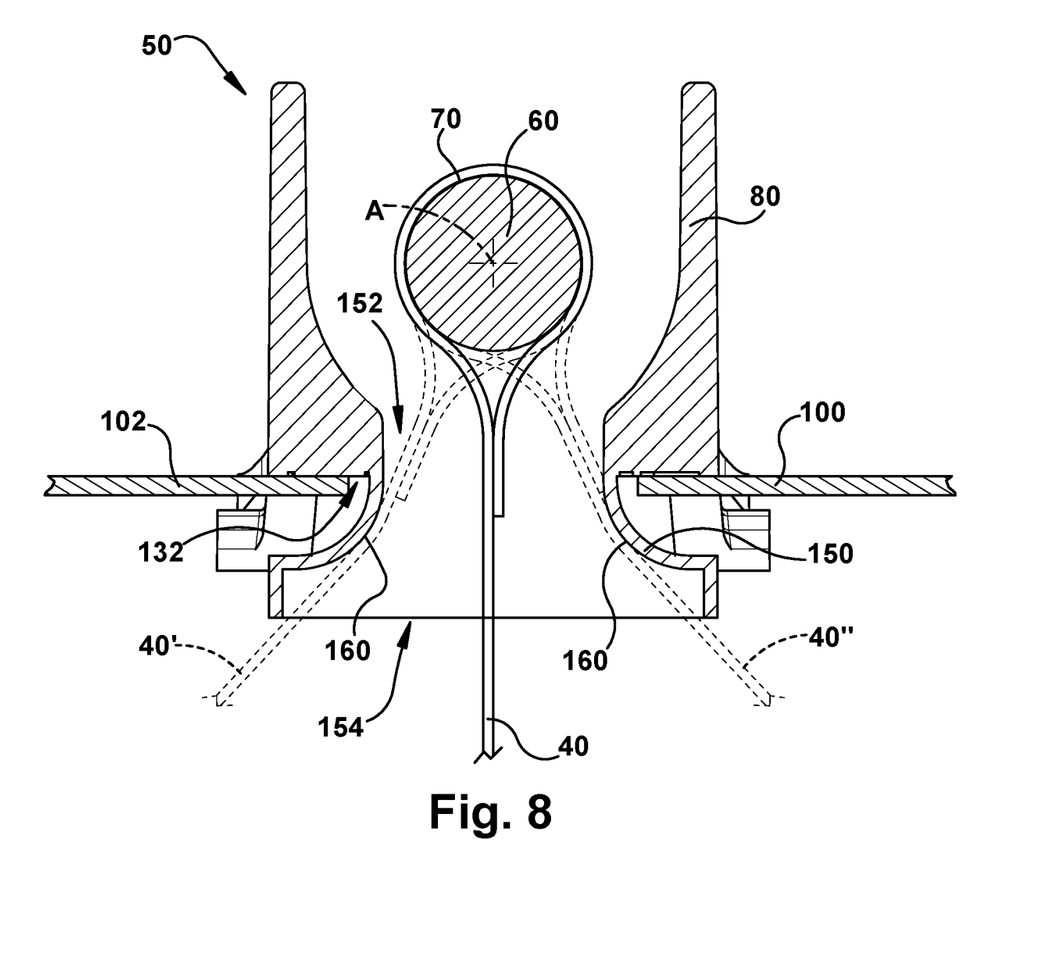
FIGS. 8 and 9 are schematic sectional views illustrating the function of the tether actuation unit.

The tether opening 132 through the rear wall 102 is configured to permit the installation of the tether channel 150. In the assembled condition of the TAU 50, the tether collar 70 on the actuator 60 is configured to align with the tether opening 94 and tether channel 150 of the TAU housing 80. Because, as described above, the tether 40 is configured to extend through the tether opening 94 in the assembled condition of the TAU 80, the tether also extends through the tether channel 150 in the assembled condition. This is best shown in FIGS. 6 and 8.

Because the tether 40 can be configured to help control deployment of the airbag 22 in a variety of manners, it will be appreciated that the direction in which the tether extends from the TAU 50 into the housing chamber 106 of the reaction canister 100 can vary. For example, if the tether 40 and TAU 50 are configured to control the deployment of an airbag chamber 28 positioned laterally on the airbag 22, the tether might extend diagonally (e.g., with respect to the rear wall 102 of the reaction canister 100) from the TAU 50. If the tether 40 and TAU 50 are configured to control the actuation of a vent 26, the tether might extend from the TAU 50 at less of an angle or perpendicularly with respect to the rear wall 102 of the reaction canister 100. This is shown in FIG. 8.

The sidewalls 160 define a wide angular range across which the tether 40 can extend from the tether channel 150 of the TAU housing 80 about the TAU axis A. Referring to FIG. 8, the tether is illustrated at 40 extending orthogonally from the TAU 50, perpendicularly with respect to the rear wall 102 of the reaction canister 100. The tether is also illustrated extending from the TAU 50 at opposite angular extremes at 40' and 40". The tether 40 can, of course, extend from the TAU 50 at any angle between these extremes. As the angle of the tether 40 changes and approaches these extremes, it engages and follows the curved contour of the sidewalls 160. It can be seen in FIG. 8 that the tether 40 is given a wide range throughout which it can extend orthogonally from the TAU 50 relative to the TAU axis A.

The outwardly curved contour of the sidewalls 160 is configured so that the tether 40 engages the sidewalls 160 along a portion of their length, as opposed to at a specific or discrete point of contact. This engagement avoids discrete contact with edges, corners, or other abrupt surfaces of the TAU housing 80 where stress risers on the tether 40 could occur. This curved, distributed engagement helps eliminate the formation of stress risers on the tether by maintaining the distribution of deployment forces along the length of the tether. The TAU 50, particularly the tether channel 150 therefore helps prevent damage and/or rupture of the tether during deployment, especially in a crash scenario in which the tether 40 is configured to maintain the connection to the airbag 22, i.e., when the TAU 50 remains unactuated.

Figure 9:
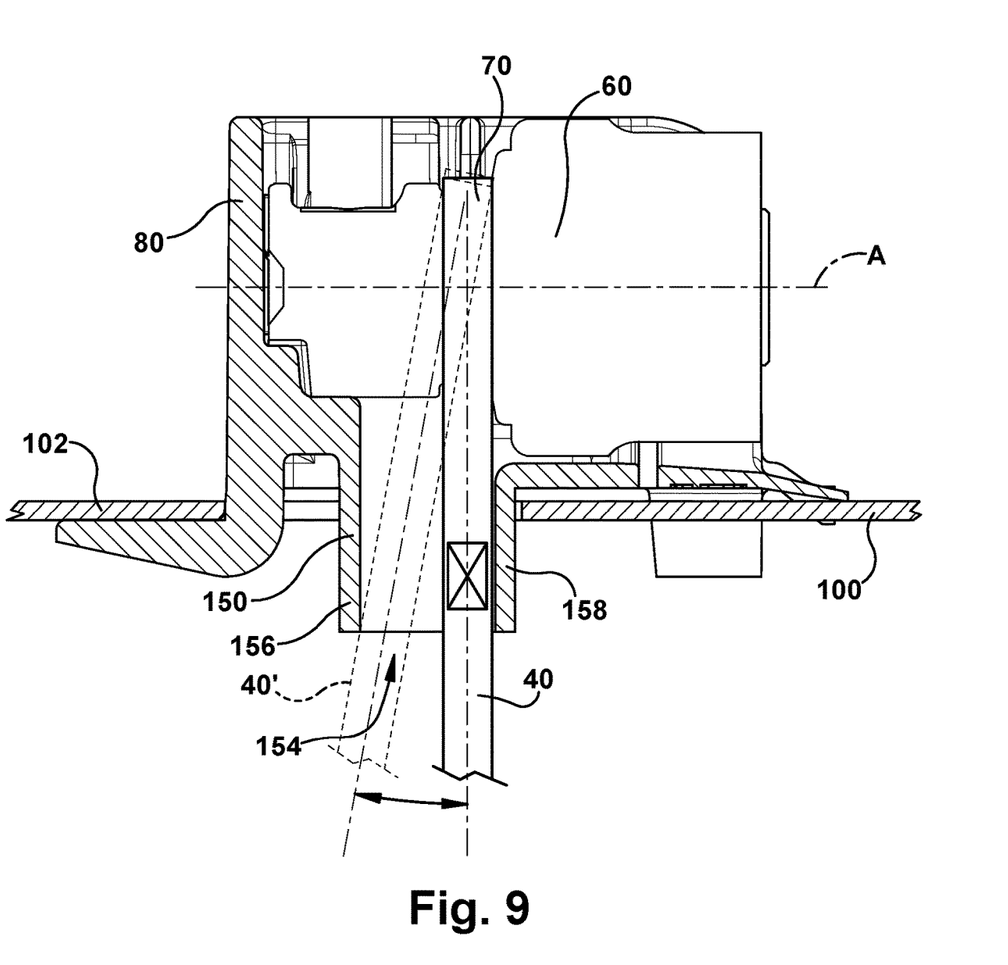

Referring to FIG. 9, front and rear walls 156 and 158, respectively, of the tether channel 150, can limit movement of the tether 40 in directions that are non-orthogonal relative to the TAU axis A. This is advantageous because forces applied to the TAU 50 in non-orthogonal directions with respect to the TAU axis A can damage the TAU. The front and rear walls 156 and 158 are configured to limit this non-orthogonal tension by limiting the angle at which the tether 40 can apply forces on the TAU 50. In doing so, the tether channel 150 can be configured to limit non-orthogonal tension to a predetermined limit or range. For example, the tether channel can be configured to limit non-orthogonal tension applied to the TAU 50 by the tether 40 to ±5°, ±10°, ±15°, etc. Additionally, the range of non-orthogonal tension limiting can be non-uniform around 0°, such as 5° in one direction and 15° in the opposite direction.

Advantageously, the TAU 50, implementing the tether channel 150, can help eliminate the need for application specific airbag module configurations. The TAU 50 can accommodate a wide range of orthogonal tether 40 movement while avoiding stress risers. The TAU housing 80 (specifically the tether channel 150) limits non-orthogonal movement of the tether 40 that can damage the TAU 60.

Due to the advantages described above, the position of the TAU 50 on the reaction canister 100 can remain the same, despite different functions of the TAU. Whereas different TAU implementations (e.g., vent vs. chamber) might otherwise require a different installation of the TAU on the reaction canister, the TAU 50, including the tether channel 150, can allow the same installation location on the canister to permit different angular extensions of the tether 40.

From the above description of the invention, those skilled in the art will perceive applications, improvements, changes and modifications to the invention. For example, it will be appreciated that the illustrated configuration of the tether channel 150, i.e., the curvature of the sidewalls 160, the dimensions of the open end 154, etc. can vary in order to accommodate various tether configurations and angles at which the tether is to extend. Such applications, improvements, changes and modifications within the skill of the art are intended to be covered by the appended claims.

The invention claimed is:

1. A tether actuation unit comprising:
an actuator configured to form a connection with a tether that is releasable in response to actuation of the actuator; and
a housing configured to receive the actuator, the housing comprising a tether channel configured to allow the tether to extend therethrough, the tether channel comprising sidewalls configured to receive and engage the tether along a portion of its length when the tether extends at an angle from the housing;
wherein the sidewalls of the tether channel are configured to limit movement of the tether in response to airbag deployment in order to limit tension applied to the actuator by the tether to a predetermined range of non-orthogonal directions with respect to a central axis of the actuator;
wherein the housing of the tether actuation unit is configured to be connected to an outer surface of an airbag housing and the tether channel is configured to extend through an opening in the airbag housing and into a housing chamber of the airbag housing.

2. The tether actuation unit recited in claim 1, wherein the sidewalls of the tether channel are also configured to permit the tether to apply tension on the actuator along a range of angles orthogonal to the central axis of the actuator, wherein the range of angles orthogonal to the central axis of the actuator is greater than the range of non-orthogonal directions with respect to the central axis of the actuator.

3. The tether actuation unit recited in claim 1, wherein the sidewalls of the tether channel comprise outwardly curved sidewalls that help define the range of angles orthogonal to the central axis of the actuator that the tether can apply tension to the actuator.

4. The tether actuation unit recited in claim 3, wherein the outwardly curved sidewalls are configured to prevent stress risers along portions of the tether that engage the housing.

5. The tether actuation unit recited in claim 1, wherein the tether channel has an outwardly flared configuration.

6. The tether actuation unit recited in claim 1, wherein the sidewalls of the tether channel comprise closely spaced, parallel sidewalls that help define the range of angles non-orthogonal to the central axis of the actuator that the tether can apply tension to the actuator.

7. The tether actuation unit recited in claim 6, wherein the closely spaced parallel sidewalls are configured to prevent tension applied to the actuator by the tether from damaging the actuator.

8. The tether actuation unit recited in claim 1, wherein the housing comprises clips configured to be received in openings in the airbag housing to connect the tether actuation unit to the airbag housing.

9. The tether actuation unit recited in claim 8, wherein the housing comprises feet configured to engage an outer surface of the airbag housing.

10. The tether actuation unit recited in claim 1, wherein the actuator comprises a tether collar portion configured to secure a looped portion of the tether, and the housing is configured so that the collar portion is aligned with the tether channel when assembled with the actuator.

11. An apparatus for helping to protect an occupant of a vehicle, comprising:
    an airbag;
    the tether actuation unit recited in claim 1; and
    a tether connected to the tether actuation unit and to a portion of the airbag;
    wherein the tether actuation unit has an unactuated condition maintaining a connection with the tether, and an actuated condition releasing its connection with the tether to help control deployment of the airbag.

12. The apparatus recited in claim 11, wherein the tether is connected to a chamber of the airbag, the tether restricting deployment of the chamber in the unactuated condition of the tether actuation unit, the tether releasing the chamber to deploy in the actuated condition of the tether actuation unit.

13. The apparatus recited in claim 11, wherein the tether is connected to an airbag vent, the tether maintaining the airbag vent in one of an open and closed condition in the unactuated condition of the tether actuation unit, the tether releasing the airbag vent to the other of the open and closed condition in the actuated condition of the tether actuation unit.

14. An airbag module comprising:
    the apparatus recited in claim 11;
    an inflator for inflating the airbag; and
    an airbag housing for supporting the airbag, the inflator, the tether actuation unit, and the tether for installation in a vehicle as a unit.

15. The airbag module recited in claim 14, wherein the airbag housing comprises a reaction canister configured for installation in an instrument panel on a passenger side of a vehicle.

16. A vehicle safety system comprising:
    the airbag module recited in claim 14;
    at least one sensor; and
    an airbag control unit that is operatively connected to the inflator, the tether actuation unit, and to the at least one sensor;
    wherein the airbag control unit is configured to identify the occurrence of a vehicle crash in response to signals received from the at least one sensor, the airbag control unit being further configured to actuate the inflator in response to detecting the vehicle crash, and to selectively actuate the tether actuation unit in response to conditions detected via the at least one sensor.

* * * * *